United States Patent
Blom et al.

(10) Patent No.: US 10,067,033 B2
(45) Date of Patent: Sep. 4, 2018

(54) SYSTEMS AND METHODS FOR IN-CYLINDER PRESSURE ESTIMATION USING PRESSURE WAVE MODELING

(71) Applicant: General Electric Company, Schenectady, NY (US)

(72) Inventors: Rogier Sebastiaan Blom, Ballston Lake, NY (US); Herbert Kopecek, Tirol (AT); Sharath Sridhar Aramanekoppa, Karnataka (IN); Johannes Huber, Tirol (AT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/923,009

(22) Filed: Oct. 26, 2015

(65) Prior Publication Data

US 2017/0115181 A1 Apr. 27, 2017

(51) Int. Cl.
  *G01M 15/08* (2006.01)
  *F02D 35/02* (2006.01)
  (Continued)

(52) U.S. Cl.
  CPC ............. *G01M 15/08* (2013.01); *F02D 19/02* (2013.01); *F02D 35/024* (2013.01);
  (Continued)

(58) Field of Classification Search
  CPC .................................................. G01M 15/08
  See application file for complete search history.

(56) References Cited

U.S. PATENT DOCUMENTS

| 5,448,978 | A | 9/1995 | Hasegawa et al. |
| 5,497,329 | A | 3/1996 | Tang |
| | | (Continued) | |

FOREIGN PATENT DOCUMENTS

| DE | 195 47 496 A1 | 7/1997 |
| EP | 1 424 480 A1 | 2/2004 |
| | (Continued) | |

OTHER PUBLICATIONS

Dutka, Arkadiusz et al.; Model-Based Engine Fault Detection and Isolation; 2009 American Control Conference; St. Louis, MO; Jun. 10-12, 2009; 8 pp.

(Continued)

*Primary Examiner* — Manish S Shah
*Assistant Examiner* — Timothy Graves
(74) *Attorney, Agent, or Firm* — GE Global Patent Operation; John Darling (57) ABSTRACT

A method for estimating pressures at a gas engine using a real-time model-based observer is implemented by a pressure estimation computing device. The method includes receiving a design schema describing an intake manifold and a plurality of components associated with the gas engine, segmenting the design schema into a plurality of segments defining a plurality of sections of the gas engine, defining a fluid dynamics model associated with each of the plurality of segments, defining a plurality of interconnected elements based on the plurality of fluid dynamics models, receiving at least one pressure measurement from at least one of a plurality of sensors associated with each of the sections of the gas engine, estimating a plurality of pressure values at each section of the gas engine, and controlling fuel injection to at least one gas cylinder based on the estimated plurality of pressure values.

15 Claims, 6 Drawing Sheets

(51) Int. Cl.
*F02D 41/26* (2006.01)
*F02D 41/00* (2006.01)
*F02D 19/02* (2006.01)
*F02D 41/14* (2006.01)

(52) U.S. Cl.
CPC ..... *F02D 41/0027* (2013.01); *F02D 41/0085* (2013.01); *F02D 41/263* (2013.01); *F02D 2041/1416* (2013.01); *F02D 2041/1437* (2013.01); *F02D 2200/0402* (2013.01); *F02D 2200/0406* (2013.01); *F02D 2200/0408* (2013.01); *Y02T 10/32* (2013.01)

(56) References Cited

U.S. PATENT DOCUMENTS

| | | | |
|---|---|---|---|
| 5,615,119 | A | 3/1997 | Vos |
| 5,623,913 | A | 4/1997 | Kitajima et al. |
| 5,878,717 | A * | 3/1999 | Zur Loye ............... F02D 35/023 123/435 |
| 6,354,268 | B1 | 3/2002 | Beck et al. |
| 6,823,675 | B2 | 11/2004 | Brunell et al. |
| 6,837,226 | B2 | 1/2005 | Wang et al. |
| 7,324,891 | B2 | 1/2008 | Hasegawa |
| 7,346,592 | B2 | 3/2008 | Yasui et al. |
| 7,685,871 | B2 | 3/2010 | Sinnamon |
| 7,801,666 | B2 | 9/2010 | Mitsuda et al. |
| 8,712,668 | B2 | 4/2014 | Tsuyuki |
| 8,720,258 | B2 | 5/2014 | Meisner et al. |
| 2005/0193739 | A1 | 9/2005 | Brunell et al. |
| 2007/0088487 | A1* | 4/2007 | Lahti ................... F02D 37/02 701/104 |
| 2009/0043447 | A1 | 2/2009 | Vershinin et al. |
| 2014/0053803 | A1 | 2/2014 | Rayl |

FOREIGN PATENT DOCUMENTS

| | | |
|---|---|---|
| EP | 1 426 594 A2 | 9/2004 |
| WO | 2014/154314 A1 | 10/2014 |

OTHER PUBLICATIONS

Larson, Edward C. et al; Model-Based Sensor and Actuator Fault Detection and Isolation; Proceedings of the American Control Conference; Anchorage, AK; May 8-10, 2002; 5 pp.

Mezher, Haitham et al.; Frequency Based Approach for Simulating Pressure Waves at the Inlet of Internal Combustion Engines Using a Parameterized Model; Applied Energy; vol. 106, 2013; pp. 275-286.

Liu, Yinhua; Modeling and Experimental Validation of Air-Fuel Ratio under Individual Cylinder Fuel Injection for Port-injection Engines; 8th IEEE International Conference on Automation Science and Engineering; Aug. 20-24, 2014; Seoul Korea.

International Search Report and Written Opinion for corresponding international application PCT/US2016/062023, dated Dec. 9, 2016.

"Model-Based Cyllinder-By-Cylinder Air-Fuel Ratio Control for SI Engines Using Sliding Observers," Shiao et al., Proceedings of the 1996 IEEE International Conference on Control Applications, Sep. 15, 1996.

"An Observer Design for Single-Sensor Individual Cylinder Pressure Control," Moraal et al., Proceedings of the 32nd Conference on Decision, and Control, Dec. 15, 1993.

"Dynamic Modeling and Analysis of Automotive Multi-Port Electronic Fuel Delivery System," 12579 Journal of Dynamics Systems, Measurement and Control 113, Mar. 1991.

* cited by examiner

SYSTEMS AND METHODS FOR IN-CYLINDER PRESSURE ESTIMATION USING PRESSURE WAVE MODELING

BACKGROUND

The field of the disclosure relates generally to gas engines, and more particularly, to methods and systems for using pressure wave modeling to estimate in-cylinder pressure within gas engines.

Many gas engines include an intake system including an intake manifold and a plurality of cylinders. Such intake manifolds include an open end to receive air and a closed end to keep air captured. Gas may be injected at an inlet valve on each of the plurality of cylinders. In such gas engines, fuel is combusted to produce power using a generator.

In many known gas engines, preferred control of combustion involves controlling and monitoring an air-to-fuel ratio. Such an air-to-fuel ratio is be referred to as "AFR" or $\lambda$. In order to control for $\lambda$, the amount of fuel injected is determined relative to the amount of air present in the gas engine. Therefore, in such gas engines it is important to accurately estimate the quantity of air in each cylinder that receive fuel injections. Many known methods of such estimations utilize a sensor-based pressure measurement at each cylinder and a pressure measurement at the intake manifold.

However, such estimations are often inaccurate. First, in such known methods it is often assumed that the pressure is constant throughout the intake manifold. Such an assumption is inaccurate due to pressure waves created by the opening and closing of inlet valves. Second, the sensor-based pressure measurements are inaccurate because the turbulent conditions within the intake manifold cause errors in the sensors. Accordingly, improved methods of estimating in-cylinder pressure and air quantity are desired to improve the control of $\lambda$.

BRIEF DESCRIPTION

In one aspect, a computer-implemented method for estimating pressures in a gas engine using a real-time model-based observer is provided. The method is implemented by a pressure estimation computing device including a processor and a memory device coupled to the processor. The method includes receiving a design schema describing an intake manifold and a plurality of components associated with the gas engine, segmenting the design schema into a plurality of segments defining a plurality of sections of the gas engine, defining a fluid dynamics model associated with each of the plurality of segments, defining a plurality of interconnected elements based on the plurality of fluid dynamics models, wherein the plurality of interconnected model elements form a network along the gas engine, wherein the network includes points of intersection between two or more model elements with zero net flow and equal pressure, receiving at least one pressure measurement from at least one of a plurality of sensors associated with each of the sections of the gas engine, and estimating a plurality of pressure values at each section of the gas engine, and controlling fuel injection to at least one gas cylinder based on the estimated plurality of pressure values.

In a further aspect, a pressure estimation computing device for estimating pressures in a gas engine using a real-time model-based observer is provided. The pressure estimation computing device includes a processor and a memory coupled to the processor. The processor is configured to receive a design schema describing an intake manifold and a plurality of components associated with the gas engine, segment the design schema into a plurality of segments defining a plurality of sections of the gas engine, define a fluid dynamics model associated with each of the plurality of segments, define a plurality of interconnected elements based on the plurality of fluid dynamics models, wherein the plurality of interconnected model elements form a network along the gas engine, wherein the network includes points of intersection between two or more model elements with zero net flow and equal pressure, receive at least one pressure measurement from at least one of a plurality of sensors associated with each of the sections of the gas engine, estimate a plurality of pressure values at each section of the gas engine, and control fuel injection to at least one gas cylinder based on the estimated plurality of pressure values.

In another aspect, a gas engine system is provided. The gas engine system includes a gas engine and a pressure estimation computing device for estimating pressures in the gas engine using a real-time model-based observer. The gas engine includes an intake manifold and a plurality of gas cylinders. The pressure estimation computing device includes a processor coupled to a memory. The processor is configured to receive a design schema describing an intake manifold and a plurality of components associated with the gas engine, segment the design schema into a plurality of segments defining a plurality of sections of the gas engine, define a fluid dynamics model associated with each of the plurality of segments, define a plurality of interconnected elements based on the plurality of fluid dynamics models, wherein the plurality of interconnected model elements form a network along the gas engine, wherein the network includes points of intersection between two or more model elements with zero net flow and equal pressure, receive at least one pressure measurement from at least one of a plurality of sensors associated with each of the sections of the gas engine, estimate a plurality of pressure values at each section of the gas engine, and control fuel injection to at least one gas cylinder based on the estimated plurality of pressure values.

DRAWINGS

These and other features, aspects, and advantages will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "fluid transmission lines" refers to a one-dimensional element that describes the flow of a gas through a pipe and, more specifically, the flow of air and gas through regions of the gas engine as described herein.

As used herein, the term "2-port element" and related terms such as "2-port representations" refer to models used to represent portions, sections, or regions of a gas engine that build upon the fluid transmission lines by adding inputs and outputs to such elements. As described herein, 2-port elements are interconnected to represent the flow of air through the gas engine.

As used herein, the term "interconnection" may refer to a sequence of a plurality of elements such as 2-port representations to simulate the flow of air through a gas engine.

As used herein, the term "model-order reduction" refers to a process undertaken to reduce the complexity of a function such as a transfer function representing the interconnected 2-port elements.

Computer systems, such as the pressure estimation computing device are described, and such computer systems include a processor and a memory. However, any processor in a computer device referred to herein may also refer to one or more processors wherein the processor may be in one computing device or a plurality of computing devices acting in parallel. Additionally, any memory in a computer device referred to may also refer to one or more memories, wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a server computer. In a further embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices.

One or more components may be in the form of computer-executable instructions embodied in a computer-readable medium.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As described above, known methods and systems for determining values of $\lambda$ or air-to-fuel ratios (ATF ratios) to control combustion have deficiencies. Specifically, at least some models inaccurately assume uniformity of pressure throughout sections of a gas engine (e.g., an intake manifold) and ignore the presence of pressure waves within the particular section or sections. Such pressure waves are created by the opening and closing of inlet valves during fuel injection. In at least some examples, such pressure waves are generated based on crank angles. In other examples, known models provided insufficiently approximation of pressure. Accordingly, improved systems and methods for efficiently determining $\lambda$ or ATF ratios are desired.

The methods and systems described herein overcome the deficiencies of known models by efficiently controlling $\lambda$ for gas engines using a pressure estimation computing device that provides a real-time model based observer (or estimator). The real-time model based observer utilizes a fluid dynamics model to determine the pressure levels of various components of the gas engine including, for example, the intake system, the gas cylinders, the exhaust manifold, the runners, and the valves.

In one embodiment, fluid dynamics in the pipe line components of the gas engine are modeled by applying FTL models to define 2-port elements which are interconnected with models representing the fluid dynamics of other components of the system, including cylinders and valves. The interconnected model facilitates a real-time model based observer (or estimator).

By applying the model of fluid transmission lines to create 2-port elements that describe air flow in the pipe line sections of the gas engine, the methods and systems allow for the analysis of pressure waves through various sections of the gas engine. Further, by creating models that are reduced in complexity for efficient processing, the methods and systems substantially allow for real-time monitoring of $\lambda$ and real-time control of $\lambda$. As a result, such systems enable improved control of fuel-injection into gas engines and enhanced combustion performance.

As used herein, the real-time model based observer also provides an estimate of the internal state of the gas engine and, more specifically, a real-time estimate of the measurements of the inputs and outputs of the gas engine. In at least some examples, the real-time model based observer utilizes a known observer model including, for example, a continuous-time case model and a peaking model.

More specifically, the systems and methods are configured to (a) receive a design schema describing an intake manifold and a plurality of components associated with the gas engine, (b) segment the design schema into a plurality of segments defining a plurality of sections of the gas engine, (c) define a fluid dynamics model associated with each of the plurality of segments, (d) define a plurality of interconnected elements based on the plurality of fluid dynamics models, such that the plurality of interconnected model elements form a network along the gas engine, wherein the network includes points of intersection between two or more model elements with zero net flow and equal pressure, (e) receive at least one pressure measurement from at least one of a plurality of sensors associated with each of the sections of the gas engine, (f) estimate a plurality of pressure values at each section of the gas engine, and (g) control fuel injection to at least one gas cylinder based on the estimated plurality of pressure values.

In an exemplary embodiment, the pressure estimation computing device utilizes fluid transmission lines (FTL) to model the flow of gas through the gas engine. Specifically, the pressure estimation computing device executes a real-time model based observer program (or estimator program) to determine the pressure levels of various components of the gas engine including, for example, the intake system, the gas cylinders, the exhaust manifold, the runners, and the valves. The real-time model based observer program uses FTL models to make such pressure determinations. As described herein, in many examples the design schema of the gas engine may vary or alternately the real-time model based observer program may model some regions (or sections) of the gas engine but not others. Accordingly, the pressure estimation computing device may use the techniques described to model regions including at least one of the intake system, the gas cylinders, the exhaust manifold, the runners, and the valves.

FTLs are developed according to a fluid transmission lines theory, where the flow of a gas (or other fluid) through a region of space (such as an intake manifold of the gas engine) are modeled as a one-dimensional element called a fluid transmission line. Pressure and flow are related by a sum of second-order transfer functions in a matrix representation. As described below, FTLs describe both upstream and downstream pressure and flow, explicitly.

Specifically, a FTL line is defined based on upstream pressure and flow and downstream pressure and flow. In an exemplary FTL, upstream pressure is given as $P_A$ and downstream pressure is given as $P_B$. Similarly upstream flow is given as $Q_A$ and downstream flow is given as $Q_B$. Such a line is described by two equations within a given s-domain. An s-domain is a complex frequency domain that is used in system modeling. A first equation describes characteristic impedance in a complex frequency domain (s-domain) at a particular cross-section is given as Z(s) in the equation below (Equation 1):

$$Z(s) = \frac{P_{(x,s)}}{Q_{(x,s)}}, \qquad \text{Equation 1}$$

where Z(s) represents an impedance, where $P_{(x,s)}$ represents pressure at a cross-section along the region, and where $Q_{(x,s)}$ represents flow at a cross-section along the region.

Further a second equation describes the relationship between a propagation operator $\Gamma(s)$ in an s-domain to upstream pressure $P_A=x_1$ and downstream pressure $P_B=x_2$ in the equation below (Equation 2):

$$\frac{P_{(x_2,s)}}{P_{(x_1,s)}} = e^{-\Gamma(s)((x_2-x_1)/L)}, \quad \text{Equation 2}$$

where $P_{(x,s)}$ represents pressure at a cross-section along the region,
where L is a normalizing length, and
where $\Gamma(s)$ is a propagation operator in an s-domain.

As given in Equations 1 and 2, Z(s) and $\Gamma(s)$ are determined by the choice of the retained fluid dynamics, or in other words by the choice of a damping model. Thus Equations 1 and 2 are used to define a framework of dynamics of gas flow in the region. Additionally, pressures $P_A$ and $P_B$ are related to flows $Q_A$ and $Q_B$ in the following equation below (Equation 3):

$$\begin{bmatrix} P_A(s) \\ Q_A(s) \end{bmatrix} = \begin{pmatrix} A(s) & B(s) \\ C(s) & D(s) \end{pmatrix} \begin{bmatrix} P_B(s) \\ Q_B(s) \end{bmatrix}, \quad \text{Equation 3}$$

where $A(s) = \cos h\, \Gamma(s)$,
where $B(s) = Z(s)\sin h\, \Gamma(s)$,
where $C(s) = (\sin h\, \Gamma(s))/(Z(s))$, and
where $D(s) = \cos h\, \Gamma(s)$.

As used herein, the representation shown in Equation 3 is referred to as an "ABCD" representation. By applying Equation 3 with specific inputs and outputs of component FTL elements, a physical approximation of the design and flow of the region is given, including causality of the transfer functions.

FTLs are represented as a plurality of 2-port elements. 2-port elements define a specific portion of the region (e.g., intake manifold) and include inputs and outputs. 2-port elements are assembled or "interconnected" to define a complex piping system such as the gas engine. As some regions such as the intake manifold include a closed end (with no "output" as used in the 2-port elements), boundary conditions are set at such 2-port elements (closed-end lines) using impedance functions that relate pressure and flow at such locations.

In at least some examples, the pressure estimation computing device verifies that restrictions on the application of FTLs are met before carrying out the methods described herein. For example, the mean velocity of air, Laminar flow, and dimensions of the various sections of the gas engine are received and processed by the pressure estimation computing device to verify that such values do not exceed limits as defined in the pressure estimation computing device.

Air flow through the system (gas engine) is defined using an acoustic damped wave equation which accounts for viscous and friction losses in the system. Such losses are estimated using a frictional coefficient. The frictional coefficient is set to different values allowing for independent quantification of losses for different modes.

The cylinder model is determined based on in-cylinder pressure models and cylinder mass flow models. In the example embodiment, in-cylinder pressure ($p_{cyl,i}$) may be described by a differential equation, depending on the ideal gas law when considering the changing volume as given in the equation below (Equation 4):

$$\frac{dp_{cyl,i}}{dt} = \frac{1}{V_{cyl,i}}\left(RT_{im}\dot{m}_{cyl,i} - \dot{V}_{cyl,i}p_{cyl,i}\right), \quad \text{Equation 4}$$

where R is the gas constant,
where $T_{im}$ is the air temperature,
where $\dot{m}_{cyl,i}$ mass flow rate into the cylinder The model given in Equation 4 does not incorporate a term representing outflow. In such examples, the real-time model-based observer resets the integrator when the exhaust valve opens or closes to the exhaust pressure. Further, $V_{cyl,i}$, defines the cylinder volume and is a function depended on the crank angle given by the following equation (Equation 5):

$$V_{cyl,i} = \frac{V_d}{2}(1 - \cos(\theta)) + V_{cl}, \quad \text{Equation 5}$$

where $V_d$ displacement volume,
where $V_{cl}$ volume of the ignition chamber,
where $\theta$ is the crank angle The cylinder model is combined with the valve model given by the orifice equation below to form a 1-port model that can be interconnected with the FTL network representing the pressure dynamics in the engine.

$$\dot{m}_{cyl,i} = \frac{p_{cyl,i}}{\sqrt{T_{im}}}\frac{A_{IV}(\theta)}{\sqrt{R}}\Pi\sqrt{\frac{2\kappa}{\kappa-1}\left(\Pi^{\frac{-2}{\kappa}} - \Pi^{\frac{-\kappa-1}{\kappa}}\right)}, \quad \text{Equation 6}$$

$$\Pi = \frac{p_i}{p_{cyl,i}}$$

where $A_{IV}(\theta)$ is the effective opening area of the inlet valve,
where $\kappa$ is the specific heat ratio,
where $p_i$ is the intake manifold pressure at cylinder i Accordingly, the pressure estimation computing device receives a design schema describing the gas engine including components such as, but not limited to, intake manifolds, exhaust manifolds, cylinders, runners, and valves. Such design schema (or design information) describes the physical structure of the gas engine and its components. As described below, such design information is used to segment the gas engine and to thereby define and interconnect a plurality of 2-port elements and apply the described modelling techniques to the gas engine. Accordingly, the pressure estimation computing device also segments the design schema into a plurality of segments. The segments may define components of the intake manifold, exhaust manifold, runners, valves, and gas cylinders. In the exemplary embodiment, the pressure estimation computing device determines such segmentation based on the number of cylinders in the gas engine. In one embodiment, the gas engine includes ten intake cylinders and accordingly the design schema is segmented into sections that are each associated with a 2-port element.

Further, the pressure estimation computing device defines a fluid dynamics model associated with each of the plurality of segments using the modelling approaches described above and herein. Further, the pressure estimation computing device also selects a fluid equation that describes air flow through the gas engine and defines the fluid transmission lines associated with each of the plurality of pipe line segments using the fluid equation.

Using the FTLs, the pressure estimation computing device also defines a plurality of interconnected 2-port elements based on the plurality of fluid dynamics models. As described, the plurality of interconnected 2-port elements forms a network along the sections of the gas engine. The resulting network includes points of intersection two or more 2-port elements with zero net flow and equal pressure. More specifically, connections between 2-port elements are created before each cylinder to identify a local pressure in front of each cylinder. In the process of defining the plurality of interconnected 2-port elements, the pressure estimation computing device selects inputs and outputs for each FTL. In the exemplary embodiment, the 2-port elements used use $P_A$ and $Q_B$ as inputs and $Q_A$ and $P_B$ as outputs. Using the approaches described above (in, e.g., Equations 1-3) the pressure estimation computing device defines transfer functions associated with the plurality of interconnected 2-port elements.

As described above, some of the plurality of interconnected 2-port elements include an open ended element (e.g., representing the open end of the intake manifold) and a closed ended element (e.g., representing the closed end of the intake manifold). Accordingly, in such examples, the pressure estimation computing device specifies a plurality of boundary conditions associated with each of the plurality of interconnected 2-port elements, and defines each of the plurality of interconnected 2-port elements using the associated boundary conditions. For the 2-port element associated with the open end, pressure estimation for the intake manifold is used as the input. For the 2-port element associated with the closed end, pressure $P_B$ and $Q_B$ relate to each other using the impedance function described above, $Z(s)$. The application of the impedance function allows for the quantification of wave reflection.

In the exemplary embodiment, efficient computation for real-time control and monitoring of $\lambda$ requires a reduction of the transfer functions associated with the interconnected 2-port elements. However, while efficient computation is important, the pressure estimation computing device validates that each of the plurality of truncated transfer functions approximates the associated one of the plurality of truncated transfer functions in order to ensure that such truncation does not unnecessarily reduce the accuracy of such transfer functions.

The pressure estimation computing device also receives at least one pressure measurement from at least one of a plurality of sensors associated with each of the gas cylinders and estimates a plurality of pressure values at each gas cylinder of the intake manifold. Further, the pressure estimation computing device controls fuel injection to at least one gas cylinder based on the estimated plurality of pressure values.

In some examples, the real-time model-based observer applies several assumptions, boundary conditions, and equation parameters in the computation of pressure wave models. First, in some embodiments, the density of air may be assumed to be constant if such an assumption does not impact the accuracy of the model. Second, as described above and herein, certain boundary conditions are applied such that (a) at the open end of the gas engine, the pressure is used as an input to the pressure wave model and (b) at the closed end of the gas engine, either (i) a total reflection of the pressure wave may be assumed at the closed end of the gas engine or (ii) the pressure at the end of the gas engine may also be used as a model input. Such assumptions may be applied for any embodiment of the real-time model-based observer.

Further, in some examples, $R_v$ is the viscous damping term and is used to account for all the losses in the section. In such examples, this viscous damping term may be used as a tuning parameter to tune the model. In other examples, the speed of the pressure wave (c) may be used for tuning the model as the exact speed of the pressure wave in the gas engine is not known. As above, the damping term may be used as a tuning parameter for any embodiment of the real-time model-based observer including the FTL-based model-based observer, the cylinder model, and the pressure wave model.

The computer-implemented systems and methods described herein also provide an efficient method of detecting errors in a sensor at a gas cylinder. More specifically, the systems and methods are configured to (a) receive a first pressure measurement from a first sensor associated with a gas cylinder, (b) receive a design schema describing the gas engine, (c) segment the design schema into a plurality of segments, (d) define a fluid dynamics model associated with each of the plurality of segments each associated with a section of the gas engine, (e) define a plurality of interconnected 2-port elements based on the plurality of dynamics models, wherein the plurality of interconnected 2-port elements form a network along the intake manifold, wherein the network includes points of intersection between interconnected 2-port elements with zero net flow and equal pressure, (f) estimate a second pressure measurement for the gas cylinder based on the plurality of interconnected 2-port elements, (g) compare the first pressure measurement to the second pressure measurement, and (h) determine that the first sensor is in an anomalous state based on the comparison of the first pressure measurement to the second pressure measurement.

Accordingly, the pressure estimation computing device receives a first pressure measurement from a first sensor associated with a gas cylinder and estimates a second pressure measurement for the gas cylinder based on the plurality of interconnected 2-port elements using the techniques described above and herein. Further, the pressure estimation computing device compares the first pressure measurement to the second pressure measurement, and determines that the first sensor is in an anomalous state based on the comparison of the first pressure measurement to the second pressure measurement.

In at least some embodiments, the pressure estimation computing device also monitors the first sensor to determine that the first sensor has changed from a normal operating state to the anomalous state and functionally provides on-line monitoring of in-cylinder pressure sensors.

Further, in some embodiments, the pressure estimation computing device additionally transmits an alert that the first sensor is in the anomalous state to any suitable user or system including online monitoring systems.

The pressure estimation computing device also determines that the first sensor is an anomalous state based on a performance threshold. More specifically, the pressure estimation computing device identifies a performance threshold defining a differential associated with the comparison between the first pressure measurement to the second pressure measurement defining the anomalous state, and determines that the first sensor is in the anomalous state based on the performance threshold. Upon determining that the first sensor is not in the anomalous state, the pressure estimation computing device also calibrates the first sensor based on the comparison of the first pressure measurement to the second pressure measurement.

Accordingly, the pressure estimation computing device facilitates a model-based estimation of air-mass flow and in-cylinder pressure and uses such estimates for a fault-tolerant control scheme that may be used to control the values of the ATF ratio and provide enhanced combustion.

Figure 1:
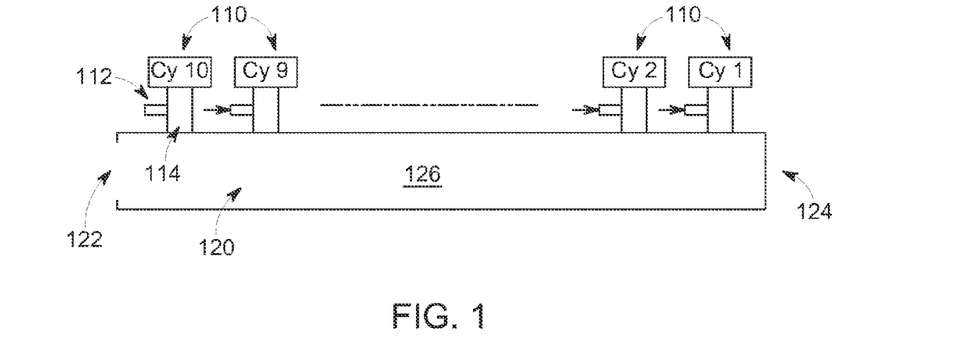
FIG. 1 is a schematic view of a gas engine including a plurality of regions including an exemplary intake manifold, a plurality of runners, a plurality of valves, and a plurality of gas intake cylinders.

FIG. 1 is a schematic view of a gas engine 100 including an exemplary intake manifold 120 and a plurality of gas intake cylinders 110. In some embodiments, gas engine 100 includes a turbocharging unit (not shown) and is in communication with an electrical generator (not shown). In the exemplary embodiment, gas engine 100 may be a 4-stroke, spark-ignited, multi-port injection-type engine including two rows of gas intake cylinders 110 arranged in a "V" configuration. Each row is tied to a crank shaft of gas engine 100 (not shown). In the exemplary embodiment, each row of gas intake cylinders 110 includes its own intake manifold 120. Accordingly, the view shown of gas engine 100 depicts one row of gas intake cylinders 110 and an associated intake manifold 120 while not depicting the other row and intake manifold.

In the example embodiment, intake manifold 120 is characterized as a long pipe that is closed on one side and open on another. In the exemplary embodiment, air is received into intake manifold 120 via an open end 122 and captured at closed end 124. Gas is received into gas engine 100 via gas intake cylinders 110 and, more specifically, via inlet valves 112 associated with each gas intake cylinder 110. As described above, combustion quality in gas engine 100 is determined, in significant part, based on a control of an air-to-fuel ratio (ATF ratio) that is referred to as λ. In the exemplary embodiment, each gas intake cylinder 110 also includes a pressure sensor 114 that determines air pressure levels of the associated gas intake cylinder 110. Pressure sensor 114 is in communication with external monitoring systems including, but not limited to, a pressure estimation computing device (not shown in FIG. 1 and described below). Intake manifold pressure sensor 126 is also configured to measure the air pressure in intake manifold 120. Intake manifold pressure sensor 126 is also in communication with external monitoring systems including, but not limited to, the pressure estimation computing device.

As described herein, control for ATF ratios or λ depends substantially on accurate measurements of the quantity of air and the quantity of gas in each gas intake cylinder 110. Although λ is estimated based on measurements determined based on pressure sensors 114 and intake manifold pressure sensor 126, such an estimate of λ assumes a constant value of pressure within intake manifold 120. However, pressure varies within intake manifold 120 because of the opening and closing of inlet valves 112. Further, conditions within gas engine 100 are turbulent and cause pressure sensors 114 to become inaccurate, mis-calibrated, or otherwise unavailable.

Figure 2:
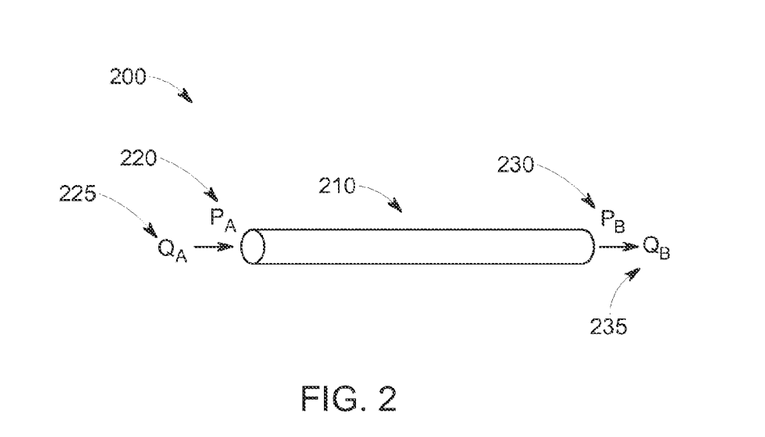
FIG. 2 is an exemplary illustration of a fluid dynamics model, and specifically a fluid transmission line (FTL) used to model the flow of air through the gas engine of FIG. 1.

FIG. 2 is an exemplary illustration 200 of a fluid transmission line (FTL) 210 used to model the flow of air through gas engine 100 (shown in FIG. 1). More specifically, as described above, FTL line 210 is defined based on upstream pressure 220, upstream flow 225, downstream pressure 230, and downstream flow 235. In FTL 210, upstream pressure 220 is given as $P_A$ and downstream pressure 225 is given as $P_B$. Similarly upstream flow 230 is given as $Q_A$ and downstream pressure 235 is given as $Q_B$. FTL 210 is described by two equations within a given s-domain. A first equation describes characteristic impedance a complex frequency domain (s-domain) at a particular cross-section is given as Z(s) in the equation below (Equation 1):

$$Z(s) = \frac{P_{(x,s)}}{Q_{(x,s)}}, \quad \text{Equation 1}$$

where Z(s) represents an impedance, where $P_{(x,s)}$ represents pressure at a cross-section along the intake manifold, and where $Q_{(x,s)}$ represents flow at a cross-section along the intake manifold.

Further a second equation describes the relationship between a propagation operator Γ(s) in an s-domain to upstream pressure $P_A = x_1$ and downstream pressure $P_A = x_1$ in the equation below, where L is a normalizing length (Equation 2):

$$\frac{P_{(x_2,s)}}{P_{(x_1,s)}} = e^{-\Gamma(s)((x_2 - x_1)/L)}, \quad \text{Equation 2}$$

where $P_{(x,s)}$ represents pressure at a cross-section along the intake manifold, where L is a normalizing length, and where Γ(s) is a propagation operator in an s-domain.

As given in Equations 1 and 2, Z(s) and Γ(s) are determined by the choice of the retained fluid dynamics, or in other words by the choice of a damping model. Thus Equations 1 and 2 is used to define a framework of dynamics of gas flow in the intake manifold. Additionally, pressures $P_A$ 220 and $P_B$ 230 is related to flows $Q_A$ 225 and $Q_B$ 235 in the following equation below (Equation 3):

$$\begin{bmatrix} P_A(s) \\ Q_A(s) \end{bmatrix} = \begin{pmatrix} A(s) & B(s) \\ C(s) & D(s) \end{pmatrix} \begin{bmatrix} P_B(s) \\ Q_B(s) \end{bmatrix}, \quad \text{Equation 3}$$

where A(s)=cos h Γ(s), where B(s)=Z(s)sin h Γ(s), where C(s)=(sin h Γ(s))/(Z(s)), and where D(s)=cos h Γ(s).

As used herein, the representation shown in Equation 3 is referred to as an "ABCD" representation. By applying Equation 3 with specific inputs and outputs of component FTL elements, a physical approximation of the design and flow of the intake manifold is given including causality of the transfer functions.

Figure 3:
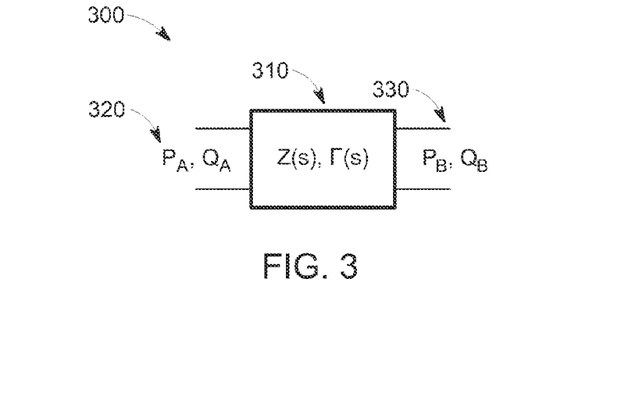
FIG. 3 is an exemplary 2-port element that may be created based on the FTL of FIG. 2 to model the flow of air through the gas engine of FIG. 1.

FIG. 3 illustrates an exemplary 2-port element 310 that is created based on FTL 210 (shown in FIG. 2) to model the flow of air through gas engine 100 (shown in FIG. 1). FTLs 210 is represented as a plurality of 2-port elements 310. As described above and herein, 2-port elements 310 define a specific portion of intake manifold 120 and include inputs 320 and outputs 330. 2-port elements are assembled or "interconnected" to define a complex piping system such as intake manifold 120, as shown in FIG. 4.

Figure 4:
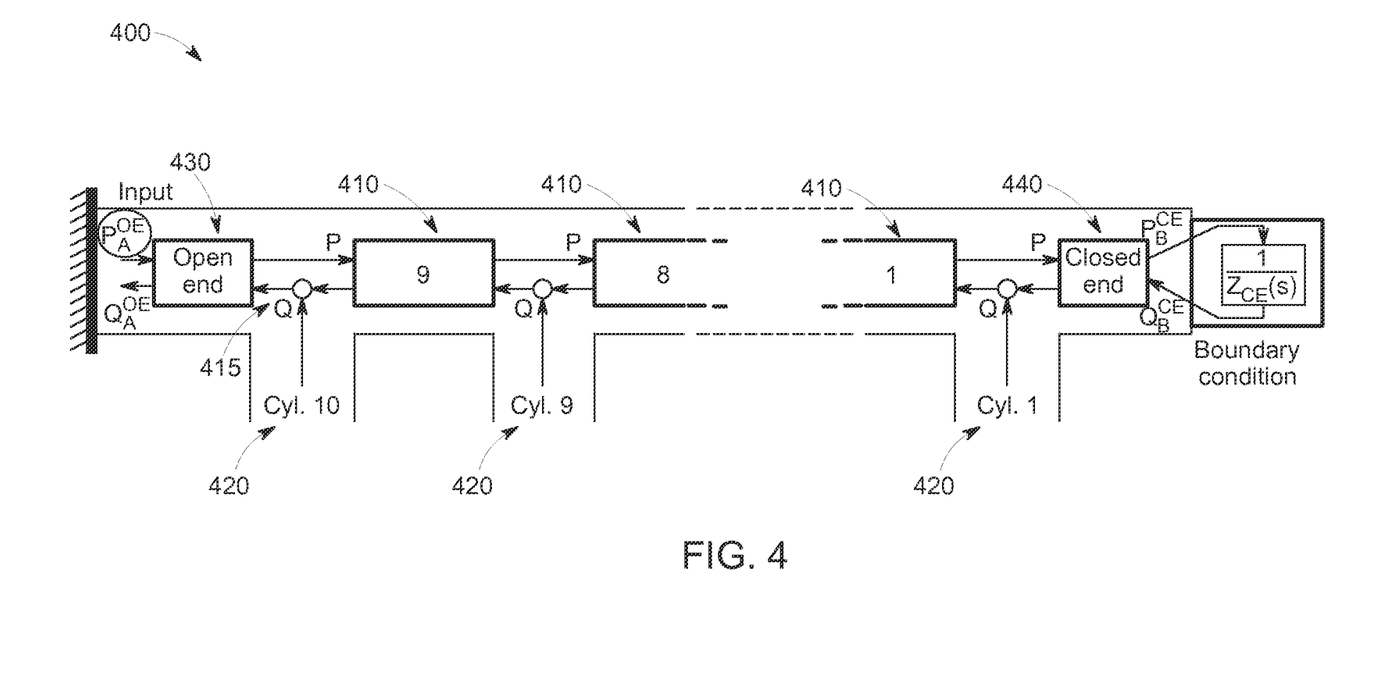
FIG. 4 is a schematic view of a network of a plurality of interconnected model elements created based on a plurality of fluid dynamics model such as the fluid dynamics model of FIG. 2.

FIG. 4 is a schematic view of a network 400 of a plurality of interconnected 2-port elements 410 created based on a plurality of fluid transmission lines such as fluid transmission line 210 (shown in FIG. 2). Using FTLs 210, the pressure estimation computing device (not shown in FIG. 4) defines a plurality of interconnected 2-port elements 410 based on the plurality of FTLs 210. As described, plurality of interconnected 2-port elements 410 forms a network 400 along intake manifold 120 (shown in FIG. 1). The resulting network 400 includes points of intersection 415 between two or more 2-port elements 410 with zero net flow and equal pressure. Connections (i.e., points of intersection) between 2-port elements 410 are created before each cylinder 420 to identify a local pressure in front of each cylinder 420. Accordingly, the systems described are configured to create interconnections between each created element to simulate and represent cylinder and valve dynamics. In the process of defining the plurality of interconnected 2-port elements, the pressure estimation computing device selects inputs and outputs for each FTL 210. In the exemplary embodiment, the 2-port elements used use $P_A$ and $Q_B$ as inputs and $Q_A$ and $P_B$ as outputs. Using the approaches described above (i.e., Equations 1-3) the pressure estimation computing device defines transfer functions associated with the plurality of interconnected 2-port elements 410.

As described above, some of the plurality of interconnected 2-port elements include an open ended element 430 (e.g., representing open end 122 of intake manifold 120) and a closed ended element 440 (e.g., representing closed end 124 of intake manifold 120). Accordingly, in such examples, the pressure estimation computing device specifies a plurality of boundary conditions associated with each of open ended element 430 and closed end element 440, and defines such 2-port elements 430 and 440 using the associated boundary conditions. For 2-port element 430 associated with open end 122, pressure estimation for intake manifold 120 is used as the input. For 2-port element 440 associated with closed end 124, pressure $P_B$ and $Q_B$ relate using the impedance function described above, $Z(s)$. The application of the impedance function allows for the quantification of wave reflection.

Figure 5:
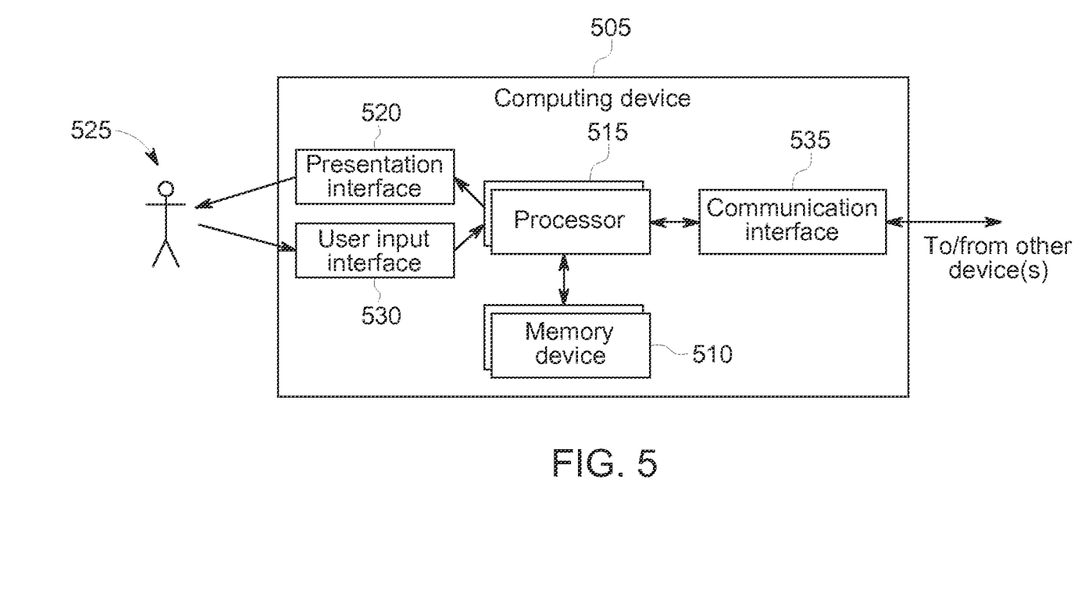
FIG. 5 is an exemplary computing device that may be used for estimating in-cylinder pressure at the gas engine of FIG. 1 using pressure wave modelling as shown in FIGS. 2-4.

FIG. 5 is an exemplary computing device 105 that is used for estimating in-cylinder pressure at gas engine 100 (shown in FIG. 1) using pressure wave modelling. Computing device 505 includes a memory device 510 and a processor 515 operatively coupled to memory device 510 for executing instructions. In the exemplary embodiment, computing device 505 includes a single processor 515 and a single memory device 510. In alternative embodiments, computing device 505 includes a plurality of processors 515 and/or a plurality of memory devices 510. In some embodiments, executable instructions are stored in memory device 510. Computing device 505 is configurable to perform one or more operations described herein by programming processor 515. For example, processor 515 is programmed by encoding an operation as one or more executable instructions and providing the executable instructions in memory device 510.

In the exemplary embodiment, memory device 510 is one or more devices that enable storage and retrieval of information such as executable instructions and/or other data. Memory device 510 includes one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 510 is configured to store operational data including, without limitation, FTL modeling algorithms, interconnecting algorithms, sensor error detection algorithms, and historic operating information. In some embodiments, processor 515 removes or "purges" data from memory device 510 based on the age of the data. For example, processor 515 overwrites previously recorded and stored data associated with a subsequent time and/or event. In addition, or alternatively, processor 515 removes data that exceeds a predetermined time interval. Also, memory device 510 includes, without limitation, sufficient data, algorithms, and commands to facilitate operation of the computer-implemented system (not shown in FIG. 4). For example, memory device 510 includes data, algorithms, and commands to facilitate the pressure wave modelling as described herein.

In some embodiments, computing device 505 includes a user input interface 130. In the exemplary embodiment, user input interface 530 is coupled to processor 515 and receives input from user 525. User input interface 530 includes, without limitation, a keyboard, a pointing device, a mouse, a stylus, a touch sensitive panel, including, e.g., without limitation, a touch pad or a touch screen, and/or an audio input interface, including, e.g., without limitation, a microphone. A single component, such as a touch screen, functions as both a display device of presentation interface 520 and user input interface 530.

A communication interface 535 is coupled to processor 515 and is configured to be coupled in communication with one or more other devices, such as a sensor or another computing device 505, and to perform input and output operations with respect to such devices. For example, communication interface 535 includes, without limitation, a wired network adapter, a wireless network adapter, a mobile telecommunications adapter, a serial communication adapter, and/or a parallel communication adapter. Communication interface 535 receives data from and/or transmit data to one or more remote devices. For example, a communication interface 535 of one computing device 505 transmits an alarm to communication interface 535 of another computing device 505. Communications interface 535 facilitates machine-to-machine communications, i.e., acts as a machine-to-machine interface. Communications interface 135 is also configured to communicate with gas engine 100 (shown in FIG. 1) and associated sensors 114 and 125 (shown in FIG. 1). As a result, computing device 505 is configured to receive data from gas engine 100 including but not limited to reported pressure measurements and ATF ratios.

Presentation interface 520 and/or communication interface 535 are both capable of providing information suitable for use with the methods described herein, e.g., to user 525 or another device. Accordingly, presentation interface 520 and communication interface 535 is referred to as output devices. Similarly, user input interface 530 and communication interface 535 are capable of receiving information suitable for use with the methods described herein and is referred to as input devices. In the exemplary embodiment, presentation interface 520 is used to visualize the data including, without limitation, fuel-to-air ratios, estimated pressure levels, and sensor pressure levels. Once such data is visualized user 525 uses user input interface 130 to execute tasks including, without limitation, recalibration of pressure sensors, remediation of pressure sensors, and any other relevant tasks. Such tasks include the use of additional software which facilitate such functions.

In the exemplary embodiment, computing device 505 is an exemplary embodiment of a computing device to be used in an exemplary high-level computer-implemented system for estimating in-cylinder pressure at a gas engine using pressure wave modelling and additionally for detecting errors in a sensor at a gas cylinder and for detecting errors in a sensor at a gas cylinder. In at least some other embodiments, computing device 505 is also an exemplary embodiment of other devices (not shown in FIG. 5) and other devices (not shown) used for methods related to those described herein. In most embodiments, computing device 505 at least illustrates the primary design of such other devices.

Figure 6:
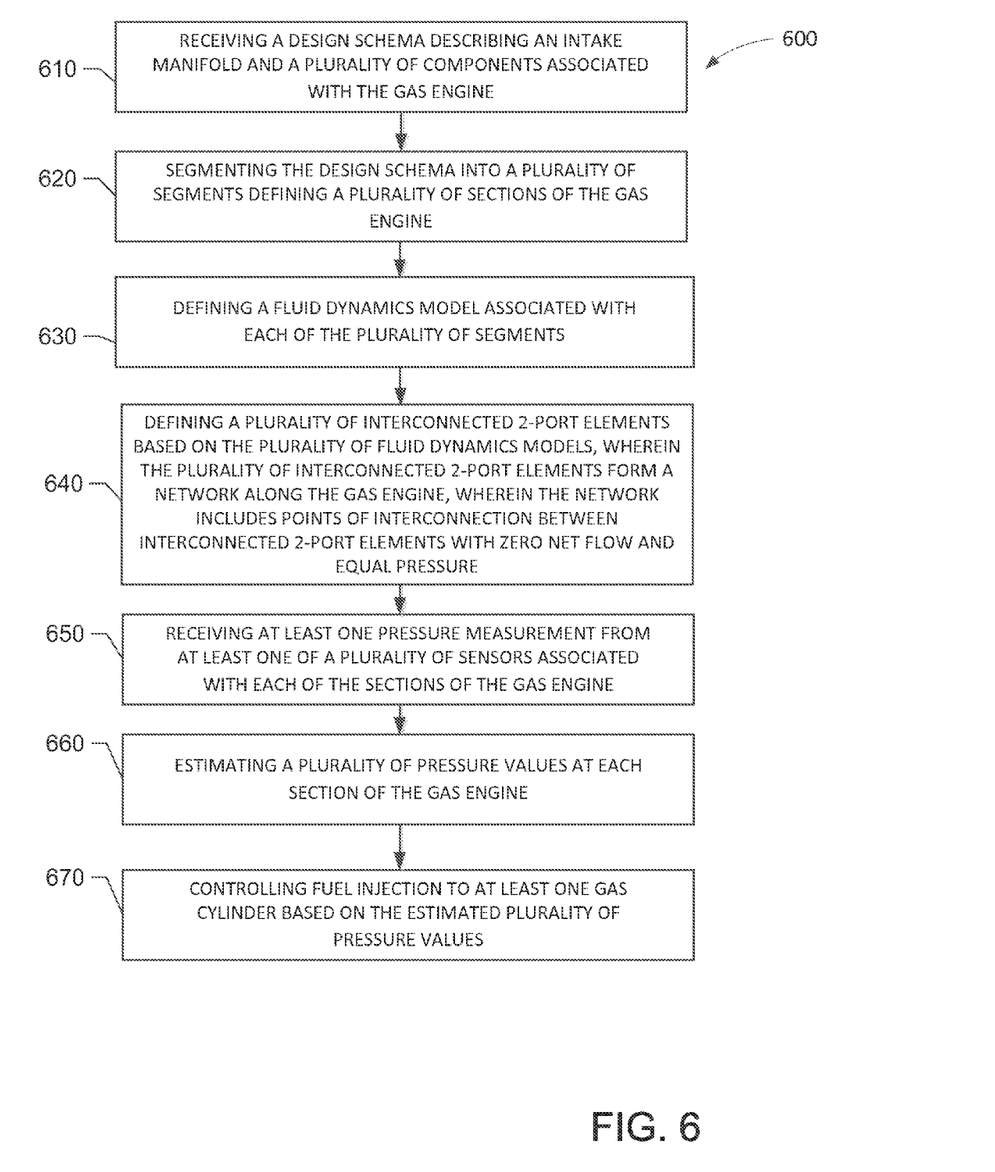
FIG. 6 is a flow chart of an exemplary process for estimating in-cylinder pressure at the gas engine of FIG. 1 using the computing device shown in FIG. 5.

FIG. 6 is a flow chart of an exemplary process 600 for estimating in-cylinder pressure at gas engine 100 (shown in FIG. 1) using pressure estimation computing device 505 (shown in FIG. 5). Pressure estimation computing device 505 receives 610 a design schema describing an intake manifold 120 (shown in FIG. 1) and a plurality of gas cylinders 110 (shown in FIG. 1) associated with the intake manifold, the intake manifold included within the gas engine 100 (shown in FIG. 1).

Specifically, pressure estimation computing device 505 receives 610 a design schema describing intake manifold 120 and a plurality of gas cylinders 110 associated with intake manifold 120. Such design schema (or design information) describes the physical structure of intake manifold 120. As described below, such design information is used to segment intake manifold 120 and to thereby define and interconnect a plurality of 2-port elements 310 (shown in FIG. 3) and apply the described modelling techniques to intake manifold 120. Accordingly, pressure estimation computing device 505 also segments 620 the design schema into a plurality of segments. In the exemplary embodiment, pressure estimation computing device 505 determines such segmentation based on the number of intake cylinders 110 in gas engine 100. In one embodiment, gas engine 100 includes ten intake cylinders 110 and accordingly the design schema is segmented into sections that are each associated with a 2-port element 310.

Further, pressure estimation computing device 505 defines 630 a fluid dynamics model associated with each of the plurality of segments using the modelling approaches described above and herein. Further, pressure estimation computing device 505 also selects a fluid equation that describes air flow through the intake manifold and defines the fluid transmission lines 210 associated with each of the plurality of pipe line segments using the fluid equation.

Using the FTLs, pressure estimation computing device 505 also defines 640 a plurality of interconnected 2-port elements 310 based on the plurality of fluid transmission lines 210. As described, the plurality of interconnected 2-port elements 310 forms a network 400 (shown in FIG. 4) along the intake manifold 120. The resulting network 400 includes points of intersection between two or more 2-port elements 310 with zero net flow and equal pressure. More specifically, connections between 2-port elements 310 are created before each cylinder 110 to identify a local pressure in front of each cylinder 110. Accordingly, the systems described are configured to create interconnections between each created element to simulate and represent cylinder and valve dynamics. In the process of defining the plurality of interconnected 2-port elements 310, pressure estimation computing device 505 selects inputs and outputs for each FTL 210. In the exemplary embodiment, 2-port elements 310 used use $P_A$ and $Q_B$ as inputs and $Q_A$ and $P_B$ as outputs. Using the approaches described above (in, e.g., Equations 1-3) pressure estimation computing device 505 defines transfer functions associated with the plurality of interconnected 2-port elements 310.

In the exemplary embodiment, efficient computation for real-time control and monitoring of $\lambda$ requires a reduction of the transfer functions associated with interconnected 2-port elements 310. However, while efficient computation is important, pressure estimation computing device 505 validates that each of the plurality of reduced-order transfer functions approximates the associated one of the plurality of reduced-order transfer functions in order to ensure that such reduction does not unnecessarily reduce the accuracy of such transfer functions.

Pressure estimation computing device 505 also receives 650 at least one pressure measurement from at least one of a plurality of sensors associated with each of the gas cylinders 110 and estimates 660 a plurality of pressure values at each gas cylinder 110 of the intake manifold 120. Further, pressure estimation computing device 505 controls 670 fuel injection to at least one gas cylinder 110 based on the estimated plurality of pressure values.

Figure 7:
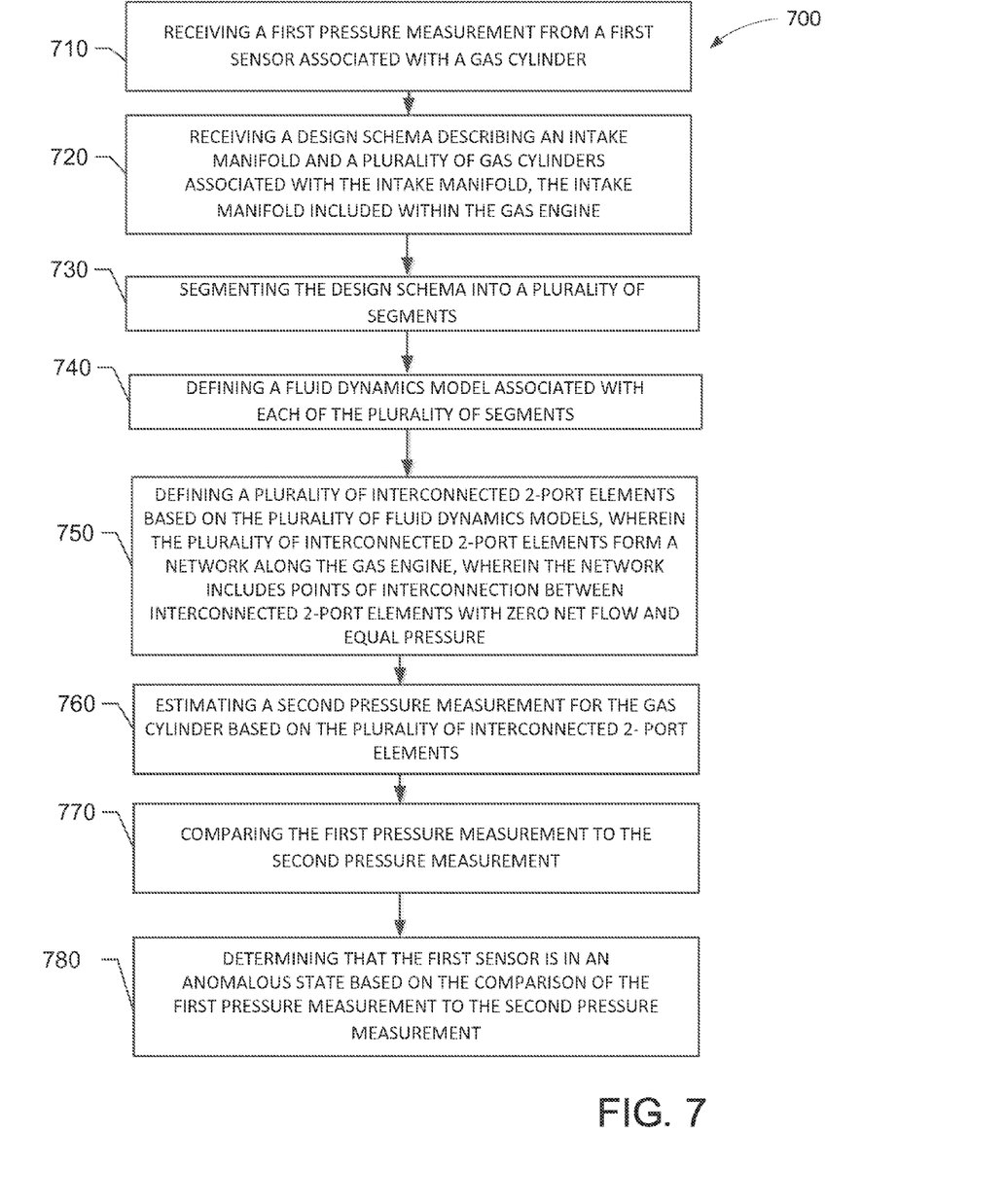
FIG. 7 is a flow chart of an exemplary process for identifying sensor failures at the gas engine of FIG. 1 using the computing device shown in FIG. 5.

FIG. 7 is a flow chart of an exemplary process 700 for identifying sensor failures at gas engine 100 (shown in FIG. 1) using pressure estimation computing device 505 (shown in FIG. 5).

Figure 8:
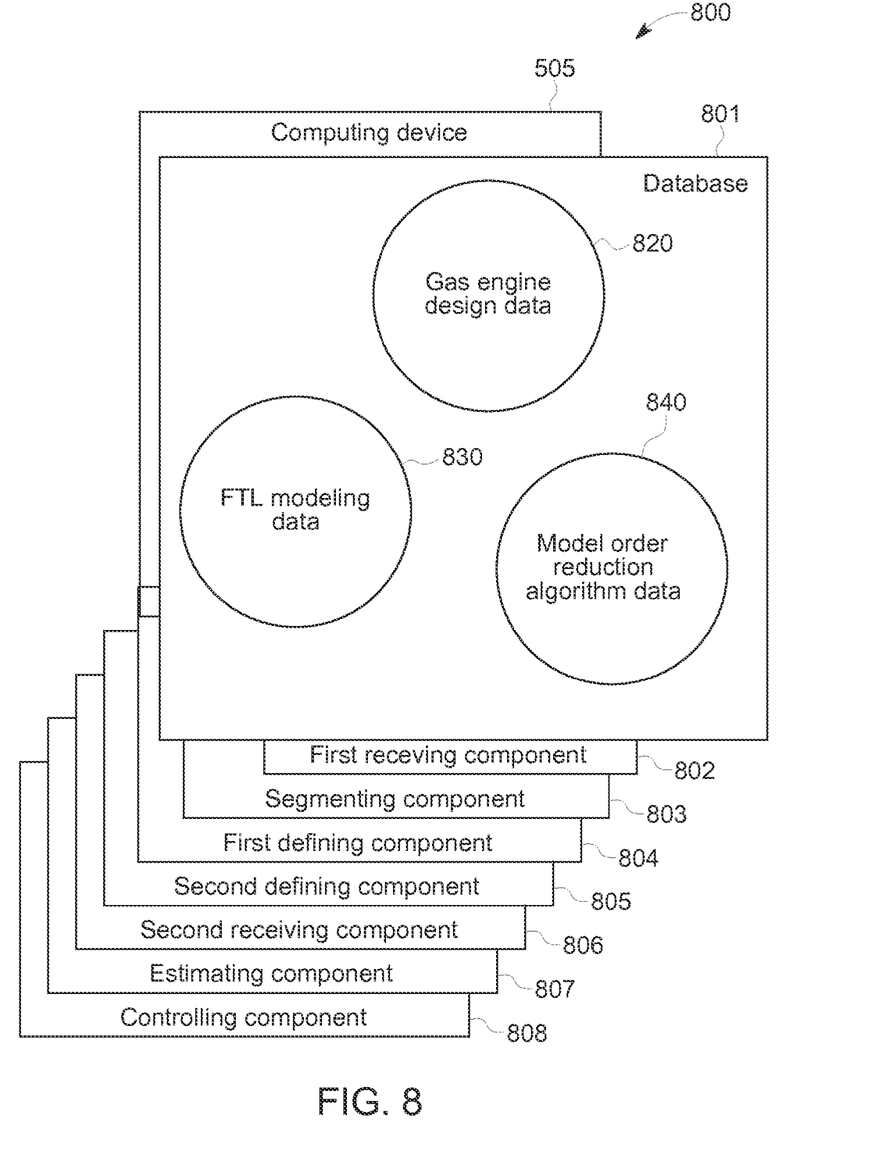
FIG. 8 is a diagram of components of one or more example computing devices such as the computing device of FIG. 5.

Pressure estimation computing device 505 is configured to receive 710 a first pressure measurement from a first sensor associated with a gas cylinder. Pressure estimation computing device 505 is also configured to receive 720 a design schema describing an intake manifold and a plurality of gas cylinders associated with the intake manifold, the intake manifold included within the gas engine. Pressure estimation computing device 505 is additionally configured to segment 730 the design schema into a plurality of segments. Pressure estimation computing device 505 is also configured to define 740 a fluid dynamics model associated with each of the plurality of segments. Pressure estimation computing device 505 is further configured to define 750 a plurality of interconnected 2-port elements based on the plurality of fluid dynamics models. In the exemplary embodiment, the plurality of interconnected 2-port elements forms a network along the intake manifold and cylinders. Additionally, the network includes points of intersection between two or more of 2-port elements with zero net flow and equal pressure. Pressure estimation computing device 505 is also configured to estimate 760 a second pressure measurement for the gas cylinder based on the plurality of interconnected 2-port elements. Pressure estimation computing device 505 is further configured to compare 770 the first pressure measurement to the second pressure measurement. Pressure estimation computing device 505 is additionally configured to determining 780 that the first sensor is in an anomalous state based on the comparison of the first pressure measurement to the second pressure measurement FIG. 8 is a diagram of components of one or more example computing devices such as pressure estimation computing device 505. FIG. 8 further shows a configuration of databases including at least database 801 (shown in FIG. 1). Database 801 is coupled to several separate components within pressure estimation computing device 505, which perform specific tasks.

Pressure estimation computing device 505 includes a first receiving component 802 for receiving a design schema describing an intake manifold and a plurality of gas cylinders associated with the intake manifold, the intake manifold included within the gas engine. Pressure estimation computing device 505 also includes a segmenting component 803 for segmenting the design schema into a plurality of segments. Pressure estimation computing device 505 additionally includes a first defining component 804 for defining a fluid dynamics model associated with each of the plurality of segments. Pressure estimation computing device 505 additionally includes a second defining component 805 for defining a plurality of interconnected 2-port elements based on the plurality of fluid dynamics models. Pressure estimation computing device 505 further includes a second receiving component 806 for receiving at least one pressure measurement from at least one of a plurality of sensors associated with each of the gas cylinders. Pressure estimation computing device 505 also includes an estimating component 807 for estimating a plurality of pressure values at each gas cylinder of the intake manifold. Pressure estimation computing device 505 further includes a controlling component 808 for controlling fuel injection to at least one gas cylinder based on the estimated plurality of pressure values.

In an exemplary embodiment, database 801 is in communication with pressure estimation computing device 505 and is divided into a plurality of sections, including but not limited to, a gas engine design data section 820, an FTL modelling data section 830, and a model-order reduction algorithm section 830. These sections within database 820 are interconnected to update and retrieve the information as required.

An exemplary technical effect of the methods and computer-implemented systems described herein includes at least one of (a) providing resiliency in the determination of λ when sensors provide inaccurate information; (b) improving the estimation of mass air flow and thereby increasing the accuracy of estimations of λ thereby increasing the quality of fuel injection and combustion in the gas engine; (c) detecting the presence of inaccuracies in sensor-based pressure measurements of in-cylinder pressure sensors;.

Exemplary embodiments for estimating in-cylinder pressure at a gas engine using pressure wave modelling and for detecting errors in a sensor at a gas cylinder are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other systems and environments and are not limited to the environments as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for estimating pressures in a gas engine using a real-time model-based observer, said method implemented by a pressure estimation computing device including a processor and a memory device coupled to the processor, said method comprising:
   receiving a design schema describing an intake manifold and a plurality of components associated with the gas engine;
   segmenting the design schema into a plurality of segments defining a plurality of sections of the gas engine;
   defining a fluid dynamics model associated with each of the plurality of segments;
   defining a plurality of interconnected 2-port elements based on the plurality of fluid dynamics models, wherein the plurality of interconnected 2-port elements form a network along the gas engine, wherein the network includes points of intersection with zero net flow and equal pressure between interconnected 2-port elements;
   receiving at least one pressure measurement from at least one of a plurality of sensors associated with each of the sections of the gas engine;
   estimating a plurality of pressure values at each section of the gas engine;
   controlling fuel injection to at least one gas cylinder based on the estimated plurality of pressure values;
   identifying a plurality of transfer functions associated with the plurality of interconnected fluid dynamics elements; and
   performing a model-order reduction of each of the fluid dynamics model elements by truncating the plurality of transfer functions to create a plurality of truncated transfer functions, each of the plurality of transfer functions is associated with one of the plurality of truncated transfer functions.

2. The method in accordance with claim 1, further comprising validating that each of the plurality of truncated transfer functions approximates the associated one of the plurality of truncated transfer functions.

3. The method in accordance with claim 1 further comprising:
   defining an air flow model that describes air flow through the intake manifold; and
   defining the fluid dynamics model associated with each of the plurality of segments using the air flow model.

4. The method in accordance with claim 1 further comprising:
   identifying a target air-to-fuel ratio (ATF ratio) associated with the gas engine; and
   controlling the fuel injection to at least one gas cylinder based on the ATF ratio and the estimated plurality of pressure values.

5. The method in accordance with claim 1 further comprising:
   specifying a plurality of boundary conditions associated with each of the plurality of interconnected fluid dynamics model elements; and
   defining each of the plurality of interconnected fluid dynamics model elements using the associated boundary conditions.

6. A pressure estimation computing device for estimating pressures in a gas engine using a real-time model-based observer, the pressure estimation computing device comprising:
   a processor; and
   a memory including an executable real-time model-based observer coupled to said processor, said processor programmed to:
   receive a design schema describing an intake manifold and a plurality of components associated with the gas engine;
   segment the design schema into a plurality of segments defining a plurality of sections of the gas engine;
   define a fluid dynamics model associated with each of the plurality of segments;

define a plurality of interconnected 2-port elements based on the plurality of fluid dynamics models, wherein the plurality of interconnected 2-port elements form a network along the gas engine, wherein the network includes points of intersection with zero net flow and equal pressure between interconnected 2-port elements:

receive at least one pressure measurement from at least one of a plurality of sensors associated with each of the sections of the gas engine;

estimate a plurality of pressure values at each section of the gas engine;

control fuel injection to at least one gas cylinder based on the estimated plurality of pressure values;

identify a plurality of transfer functions associated with the plurality of interconnected 2-port elements; and perform a model-order reduction of each of the fluid transmission lines by truncating the plurality of transfer functions to create a plurality of truncated transfer functions, each of the plurality of transfer functions is associated with one of the plurality of truncated transfer functions.

7. A pressure estimation computing device in accordance with claim 6 wherein the processor is further programmed to validate that each of the plurality of truncated transfer functions approximates the associated one of the plurality of truncated transfer functions.

8. A pressure estimation computing device in accordance with claim 6 wherein the processor is further programmed to:
select an air flow model that describes air flow through the intake manifold; and
define the fluid transmission line associated with each of the plurality of the pipe line segments using the air flow model.

9. A pressure estimation computing device in accordance with claim 6 wherein the processor is further programmed to:
identify a target air to fuel ratio (ATF ratio) associated with the gas engine; and
control the fuel injection to at least one gas cylinder based on the ATF ratio and the estimated plurality of pressure values.

10. A pressure estimation computing device in accordance with claim 6 wherein the processor is further programmed to:
specify a plurality of boundary conditions associated with each of the plurality of interconnected 2-port elements; and
define each of the plurality of interconnected 2-port elements using the associated boundary conditions.

11. A gas engine system comprising an intake manifold and a plurality of gas cylinders; and
a pressure estimation computing device for controlling fuel injection in said gas engine, said pressure estimation computing device in communication with said gas engine, said gas engine system comprising:

a processor; and
a memory coupled to said processor, said processor programmed to:
receive a design schema describing an intake manifold and a plurality of components associated with the gas engine;
segment the design schema into a plurality of segments defining a plurality of sections of the gas engine;
define a fluid dynamics model associated with each of the plurality of segments;
define a plurality of interconnected 2-port elements based on the plurality of fluid dynamics models, wherein the plurality of interconnected 2-port elements form a network along the gas engine, wherein the network includes points of intersection between interconnected 2-port elements with zero net low and equal pressure;
receive at least one pressure measurement from at least one of a plurality of sensors associated with each of the sections of the gas engine;
estimate a plurality of pressure values at each section of the gas engine; and
control fuel injection to at least one gas cylinder based on the estimated plurality of pressure values, wherein the processor is further programmed to:
identify a plurality of transfer functions associated with the plurality of interconnected 2-port elements;
perform a model-order reduction of each of the fluid transmission lines by truncating the plurality of transfer functions to create a plurality of truncated transfer functions, each of the plurality of transfer functions is associated with one of the plurality of truncated transfer functions.

12. The gas engine system of claim 11, wherein the processor is further programmed to validate that each of the plurality of truncated transfer functions approximates the associated one of the plurality of truncated transfer functions.

13. The gas engine system of claim 11 wherein the processor is further programmed to:
select a fluid equation that describes air flow through said intake manifold; and
define the fluid transmission line associated with each of the plurality of segments using the fluid equation.

14. The gas engine system of claim 11, wherein the processor is further programmed to:
identify a target air-to-fuel ratio (ATF ratio) associated with said gas engine; and control the fuel injection to at least one said gas cylinder based on the ATF ratio and the estimated plurality of pressure values.

15. The gas engine system of Claim 11, wherein the processor is further programmed to:
specify a plurality of boundary conditions associated with each of the plurality of interconnected 2-port elements; and
define each of the plurality of interconnected 2-port elements using the associated boundary conditions.

* * * * *